US008719528B2

(12) United States Patent
Kimura et al.

(10) Patent No.: US 8,719,528 B2
(45) Date of Patent: *May 6, 2014

(54) WATER MARKING IN A DATA INTERVAL GAP

(71) Applicant: International Business Machines Corporation, Armonk, NY (US)

(72) Inventors: Tomoaki Kimura, Fujisawa (JP); Satoshi Tohji, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,737

(22) Filed: Jul. 9, 2013

(65) Prior Publication Data

US 2014/0019700 A1    Jan. 16, 2014

Related U.S. Application Data

(60) Continuation of application No. 11/395,574, filed on Mar. 31, 2006, now Pat. No. 8,539,181, which is a division of application No. 10/689,264, filed on Oct. 20, 2003, now Pat. No. 7,072,131.

(30) Foreign Application Priority Data

Oct. 22, 2002   (JP) ................. 2002-306830

(51) Int. Cl.
    *G06F 12/00*    (2006.01)
(52) U.S. Cl.
    USPC ............. 711/163; 711/164; 711/E12.091; 711/E12.092; 711/E12.093; 726/26; 726/27; 726/28; 726/29; 726/32
(58) Field of Classification Search
    None
    See application file for complete search history.

(56) References Cited

U.S. PATENT DOCUMENTS

| 4,028,539 | A  | 6/1977  | Jacobs          |
|-----------|----|---------|-----------------|
| 4,637,023 | A  | 1/1987  | Lounsbury et al.|
| 4,979,059 | A  | 12/1990 | Sengoku         |
| 5,617,432 | A  | 4/1997  | Eggenberger et al. |
| 5,644,709 | A  | 7/1997  | Austin          |
| 6,009,547 | A  | 12/1999 | Jaquette et al. |
| 6,212,660 | B1 | 4/2001  | Joeressen et al.|
| 6,367,048 | B1 | 4/2002  | McAuliffe et al.|
| 6,477,127 | B1 | 11/2002 | Osada et al.    |
| 6,751,757 | B2 | 6/2004  | Biskup et al.   |

(Continued)

FOREIGN PATENT DOCUMENTS

| JP | 10065912 | 3/1998 |
| JP | 11164235 | 6/1999 |

(Continued)

*Primary Examiner* — Reginald Bragdon
*Assistant Examiner* — Baboucarr Faal
(74) *Attorney, Agent, or Firm* — Griffiths & Seaton PLLC

(57) ABSTRACT

A storage device in which file data is divided into multiple blocks for storage on a recording medium is provided. The storage device includes an additional data storing section for storing additional data to be recorded on the recording medium in association with the data to be written, a position determining section for determining recording positions on the recording medium where the blocks should be respectively written, based on the additional data, and a block writing section for writing the respective blocks on the recording positions on the recording medium determined by the recording position determining section. The additional data this defines a gap length between blocks of recorded data. During a read operation, if the gap length does not comport with the additional data, then an error is assumed.

20 Claims, 6 Drawing Sheets

(56) References Cited

U.S. PATENT DOCUMENTS

| | | |
|---|---|---|
| 6,771,668 B2 | 8/2004 | Fukunaga et al. |
| 6,836,844 B1 | 12/2004 | Kori et al. |
| 6,850,619 B1 | 2/2005 | Hirai |
| 2004/0083332 A1 | 4/2004 | Kimura et al. |

FOREIGN PATENT DOCUMENTS

| | | |
|---|---|---|
| JP | 11250572 | 9/1999 |
| JP | 2002124034 | 4/2002 |
| JP | 2004005800 | 1/2004 |

WATER MARKING IN A DATA INTERVAL GAP

REFERENCE TO RELATED APPLICATIONS

This application is a continuation of U.S. patent application Ser. No. 11/395,574, now U.S. Pat. No. 8539181, filed on Mar. 31, 2006, which claims priority to Japanese Patent Application No. 2002-306830, filed on Oct. 22, 2002, and entitled "Storage Device, Program for Controlling Storage Device, Method for Controlling Storage Device and Recording Medium."

BACKGROUND OF THE INVENTION

1. Technical Field

The present invention relates to a storage device, a program for controlling the storage device, a method for controlling the storage device and a recording medium. Particularly, the present invention relates to a storage device for recording additional data in association with data to be recorded when the data to be recorded is divided into multiple blocks and recorded on a recording medium, a program for controlling the storage device, a method for controlling the storage device and a recording medium.

2. Description of the Related Art

With a recent increase in demand for distribution of digital data, there have been developed methods for adding data for identifying digital data to the digital data. For example, Japanese Patent Publication No. 2001-518651 discloses a method for incorporating electronic watermarking data into digital data such as audio, video and image data.

Since the method of incorporating electronic watermarking data into digital data itself changes the original digital data, it is not appropriate to apply this method to digital data that cannot be changed, such as a program of an information processing system or accounting information. In such a case, therefore, a method of adding data to be used for identification of digital data without changing the digital data itself is desirable.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

DETAILED DESCRIPTION OF THE DRAWINGS

The present invention is now described below with reference to its embodiments. It should be noted, however, that the embodiments do not limit the scope of the invention defined by the claims, and all the combinations of features described in the embodiments are not necessarily essential for the invention to solve the problem.

Figure 1:
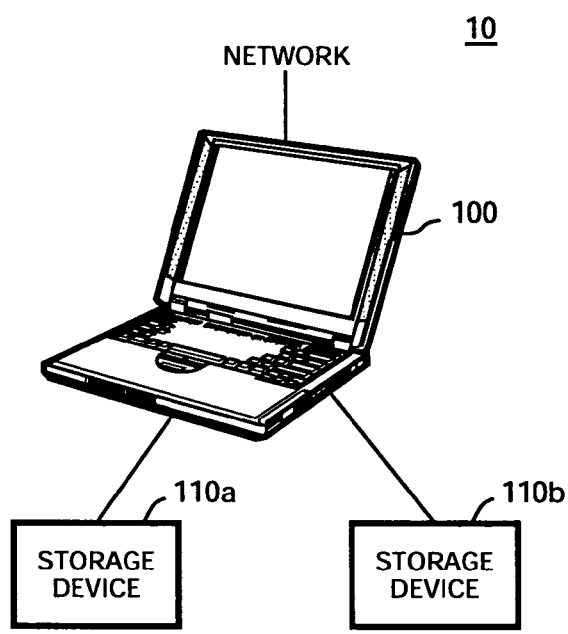
FIG. 1 shows a configuration of storage system 10 according to the embodiment of the present invention.

FIG. 1 shows a configuration of a storage system 10 according to the embodiment. The storage system 10 according to the embodiment is provided with an information processing device 100 and storage devices 110a and 110b.

The information processing device 100 is connected to the storage devices 110a and 110b and accesses the storage devices 110a and 110b based on a request received from another information processing device connected via the network. In other words, when a data write request is received from another information processing device, the information processing device 100 sends the data to be written to a storage device 110 to which the data should be written and causes the storage device 100 to perform a writing process. On the contrary, when a data read request is received from another information processing device, the information processing device 100 causes a storage device 110 from which the data should be read to perform a reading process, and sends the read data to the information processing device requesting the data. Also, the information processing device 100 performs a copy operation between recording media of the storage devices 110a and 110b based on, for example, an instruction from a user of the storage system 10.

Figure 2:
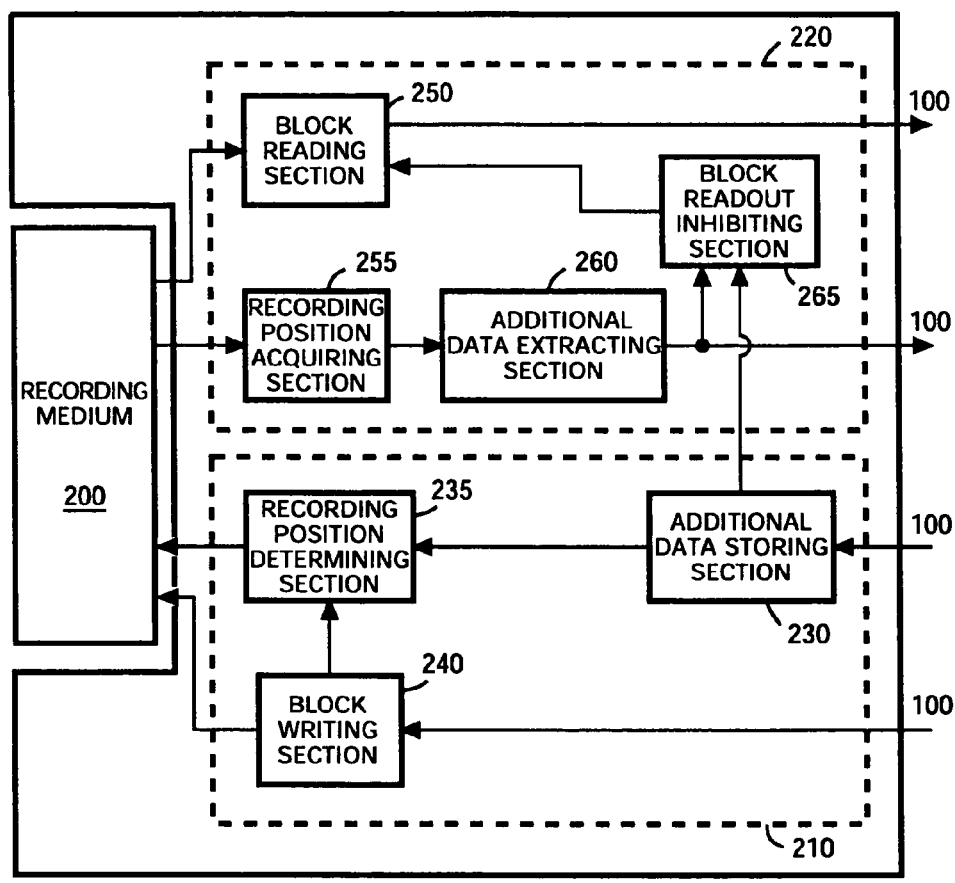
FIG. 2 shows a configuration of storage device 110a according to the embodiment of the present invention.

FIG. 2 shows a configuration of a storage device 110a according to the embodiment. When dividing data to be written into multiple blocks and recording them on a recorded medium, the storage device 110a according to the embodiment incorporates additional data as recording positions of the respective blocks. Thus, the additional data can be recorded on the recording medium without changing the data to be written.

The storage device 110a is provided with a write-control section 210 and a read-control section 220 and uses a recording medium 200. Since the configuration of the storage device 110b is almost the same as that of the storage device 110a, the description thereof is omitted here.

The recording medium 200 records multiple blocks produced by dividing data to be written. A magnetic tape conforming to the LTO (Linear Tape-Open) standard, for example, is used as the recording medium 200 according to the embodiment. Alternatively, other recording media, such as a magnetic disk, an optical disk, a magneto-optical disk, and a semiconductor memory, may be used as the recording medium 200.

The write-control section 210 receives a write request and data to be written from the information processing device 100 and writes the data to be written to the recording medium 200. The write-control section 210 comprises an additional data storing section 230, a recording position determining section 235 and a block writing section 240.

The additional data storing section 230 stores additional data to be recorded on the recording medium 200 in association with the data to be written. In this case, the additional data may be electronic watermarking data including device identification information such as a serial number of the storage device 110a, date and time of writing, identification information for the data to be written which is specified by a user of the storage device 110a, a password for releasing a read restriction on the data to be written, and the like, which is added to identify the data to be written. Alternatively, the additional data may include various information, such as fault information for identifying a fault caused in writing onto the recording medium 200, which is usually concealed from the user of the storage device 110a.

The recording position determining section 235 determines recording positions on the recording medium 200 where the blocks produced by dividing the data to be written are respectively written, based on the additional data acquired from the additional data storing section 230. By dividing the data to be written into multiple blocks and causing the recording position determining section 235 to specify recording positions where the respective blocks are written, the block writing section 240 writes the respective blocks to the recording positions on the recording medium that have been determined by the recording position determining section 235.

The read-control section 220 receives a read request from the information processing device 100 and reads data to be read, which has been divided into multiple blocks and recorded on the recording medium 200. The read-control section 220 comprises a block reading section 250, a recording position acquiring section 255, an additional data extracting section 260 and a block readout inhibiting section 265.

The block reading section 250 reads multiple blocks from the recording medium 200. The recording position acquiring section 255 acquires recording positions on the recording medium 200 where the respective blocks are recorded. The recording position acquiring section 255 then composes data to be read by putting together the read blocks, and sends it to the information processing device 100. In this case, the recording position acquiring section 255 may acquire from the block reading section 250 the recording positions specified by the block reading section 250 to read the respective blocks. The additional data extracting section 260 extracts additional data recorded on the recording medium 200 in association with the data to be read, from the recording positions corresponding to the blocks, respectively, which have been acquired by the recording position acquiring section 255. The additional data extracting section 260 sends the additional data to the information processing device 100 if it has been set to do so.

In the case where the additional data is electronic watermarking data, the block readout inhibiting section 265 inhibits the blocks from being read by the block reading section 250 if the additional data extracted by the additional data extracting section 260 does not correspond to electronic watermarking data to be recorded on the recording medium 200 in association with data to be written in a writing process. The block readout inhibiting section 265 according to the embodiment may use additional data stored in the additional data storing section 230 as electronic watermarking data to be recorded on the recording medium 200 in association with data to be written in a writing process. In this case, the additional data stored in the additional data storing section 230 may be data stored in advance, such as device identification information of the storage device 110a, or data specified through the information processing device 100 when the recording medium 200 is read.

The following functions can be provided by the storage device 110a described above.

(1) Case where Electronic Watermarking Data is Recorded as Additional Data:

The storage device 110a can embed electronic watermarking data for identifying data to be written in a recording medium 200 as recording positions of the respective blocks produced by dividing the data to be written. Accordingly, identification information of a storage device which has performed writing to the recording medium 200, time and date of the writing, and the user who has requested the writing, for example, can be embedded in the recording medium 200 as electronic watermarking data, and it is possible to prove that the recording medium 200 has been completely copied illegally, based on such information.

In some storage devices, information on recording positions of the respective blocks is lost when the recording medium 200 is copied. In this case, it is possible to prove that a recording medium is a copied one by detecting that the same data as that on the recording medium 200 is recorded thereon and electronic watermarking data has been lost.

Furthermore, by inhibiting multiple blocks from being read by the block reading section 250 if recording positions of the blocks read from the recording medium 200 in a reading process of the recording medium 250 do not correspond to valid electronic watermarking data, it is possible to prevent the recording medium 200, from which the electronic watermarking data has been lost due to illegal copying, from being read.

(2) Case where Data Other Than Electronic Watermarking Data is Recorded as Additional Data:

In the storage device 110a, it is possible to record data, which usually cannot be read by a user of the storage system 10, on a recording medium 200 as additional data. For example, in the storage device 110a, fault information for identifying a fault caused during writing to a recording medium is stored in the additional data storing section 230 and is written as additional data to a recording medium 200 together with data to be written. This allows a user or a manufacturer of the storage system 10 to identify a fault caused during writing by acquiring the additional data from the recording medium 200 in case of any error caused in writing to the recording medium 200.

Figure 3:
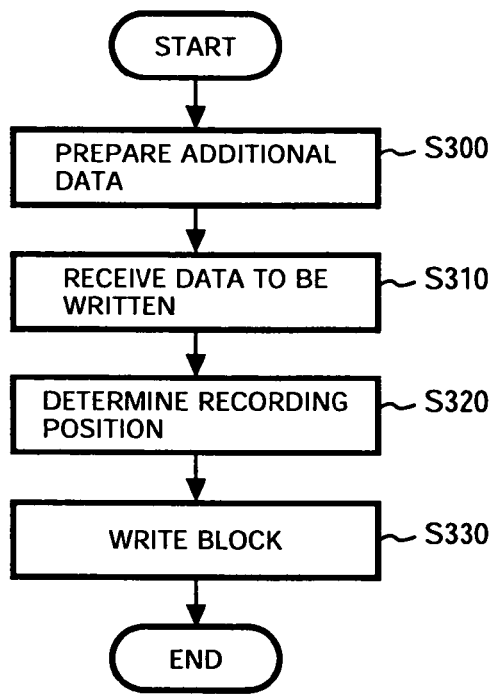
FIG. 3 shows a writing process flow in storage device 110a according to the embodiment of the present invention.

FIG. 3 shows a writing process flow in the storage device 110a according to the embodiment. When a write request is received from the information processing device 100, the storage device 110a prepares additional data to be recorded on the recording medium 200 in association with data to be written and stores it in the additional data storing section 230 (S300). In this case, the additional data may be specified by a user of the storage system 10 and stored in the additional data storing section 230 via the information processing device 100, or it may be generated through conversion of the data to be written based on a predetermined algorithm, or it may be set in the additional data storing section 230 in advance when the storage device 110a is manufactured.

Next, the block writing section 240 receives data to be written from the information processing device 100 and divides it into multiple blocks (S310). The recording position determining section 235 then determines recording positions on the recording medium 200 where the blocks divided by the block writing section 246 are respectively written (S320). The block writing section 240 writes the respective blocks to the recording positions on the recording medium determined by the recording position determining section 235 (S330).

Figure 4:
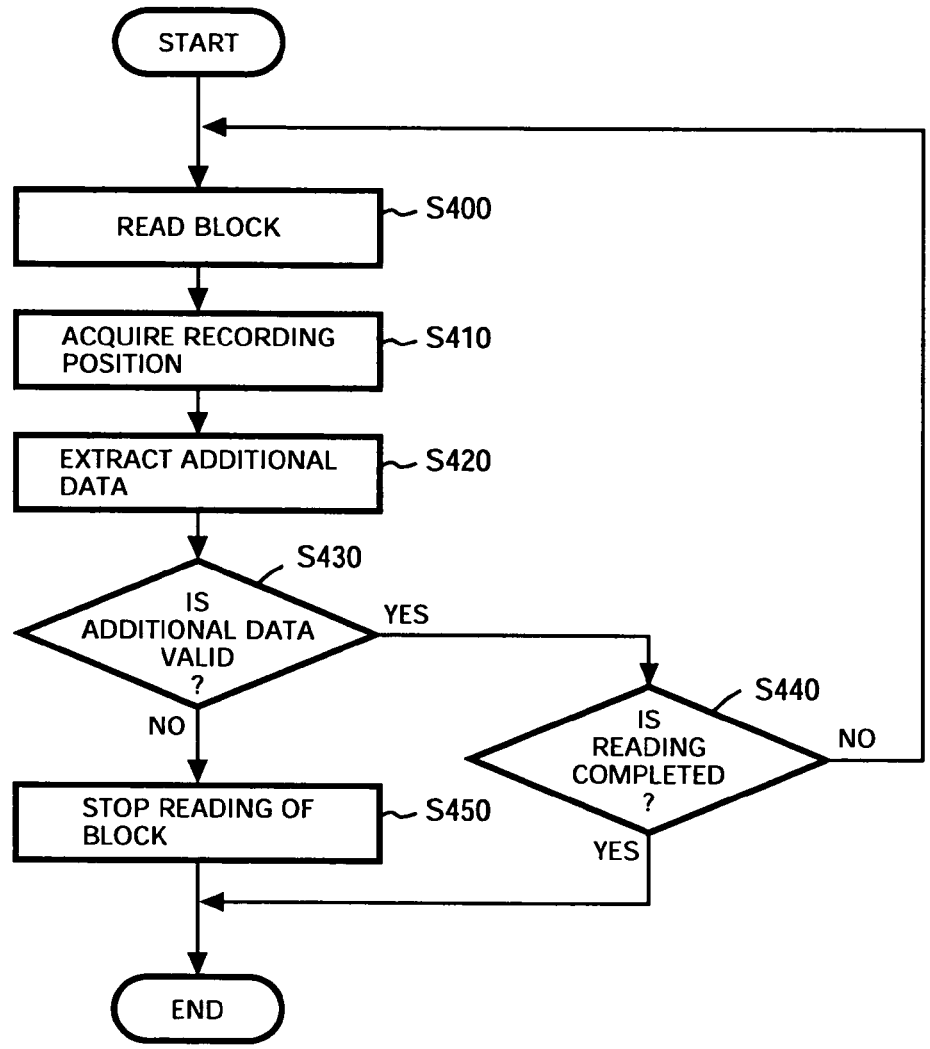
FIG. 4 shows a reading process flow in storage device 110a according to the embodiment of the present invention.

FIG. 4 shows a reading process flow in the storage device 110a according to the embodiment. Particularly, FIG. 4 shows a reading process in the case where portions of electronic watermarking data, for example, one bit data values are recorded on the respective recording positions of the blocks.

When a read request is received from the information processing device 100, the block reading section 250 sequentially reads each block (S400). Next, the recording position acquiring section 255 sequentially acquires a recording position of each block read by the block reading section 250 (S410). The additional data extracting section 260 then sequentially extracts additional data recorded on the recording medium 200 in association with the data to be read from each of the recording positions of the blocks that have been acquired by the recording position acquiring section 255 (S420).

If the recording position of one block acquired by the recording position acquiring section 255 does not correspond to the electronic watermarking data recorded on the recording medium 200 in association with the data to be written in the writing process, the block readout inhibiting section 265 determines that the extracted additional data is invalid (S430). More particularly, if the additional data extracted by the additional data extracting section 260 does not match the corresponding portion of the electronic watermarking data stored in the additional data storing section 230, then the block readout inhibiting section 265 determines that the additional data is invalid. If the additional data is determined to be invalid, the block readout inhibiting section 265 inhibits reading of the block that has been determined at S430 to be stored in a recording position that does not correspond to the electronic watermarking data, and subsequent blocks (S450). In response to this, the block reading section 250 stops reading of the blocks starting from that block. In this case, the block reading section 250 may read some blocks starting from that block before reading is stopped because the stop of reading is late, for example.

Figure 5:
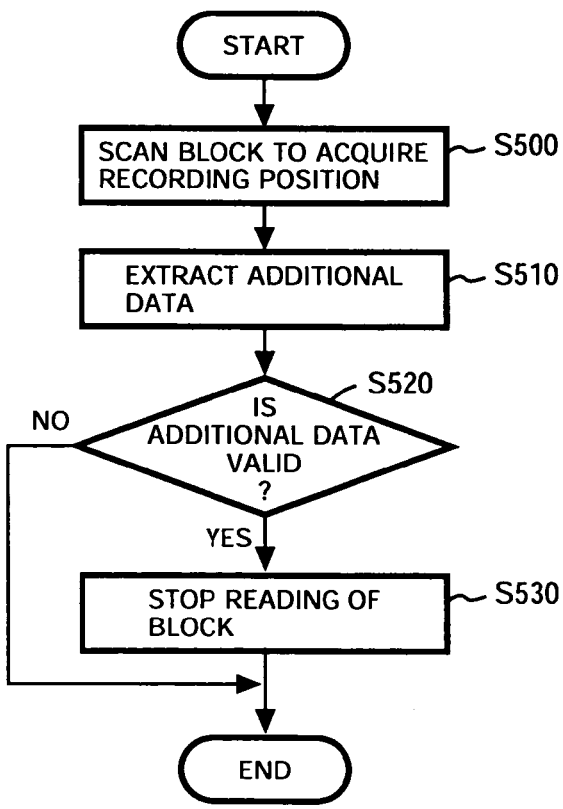
FIG. 5 shows a reading process flow in storage device 110a according to the modified embodiment of the present invention.

On the contrary, if the additional data is determined to be valid at S430, then the process from S400 to S430 is repeated until reading of the blocks is completed (S440). Through the reading process described above, the storage device 110a can sequentially extract the additional data that has been added in association with the data to be written in the writing process. The storage device 110a can stop reading of the data from the recording medium 200 when the extracted additional data does not correspond to the electronic watermarking data. FIG. 5 shows a reading process flow in the storage device 110a according to a modified embodiment.

When a recording medium 200 is mounted on the storage device 110a, the recording position acquiring section 255 scans multiple blocks included in the data written on the recording medium 200 to acquire multiple recording positions corresponding to the respective blocks (S500). Next, the additional data extracting section 260 extracts additional data recorded on the recording medium 200 in association with the data to be read, from the recording positions that have been acquired by the recording position acquiring section 255 (S510). When a read request is received from the information processing device 100, the block readout inhibiting section 265 determines that the additional data is invalid if the recording positions do not correspond to the electronic watermarking data which was recorded in association with the data to be written when the data was written to the recording medium 200 in the writing process (S520). If the additional data is determined to be invalid, the block readout inhibiting section 265 inhibits the blocks from being read by the block reading section 250. On the contrary, if the additional data is determined to be valid, the block reading section 250 reads the blocks and sends them to the information processing device 100.

Figure 6:
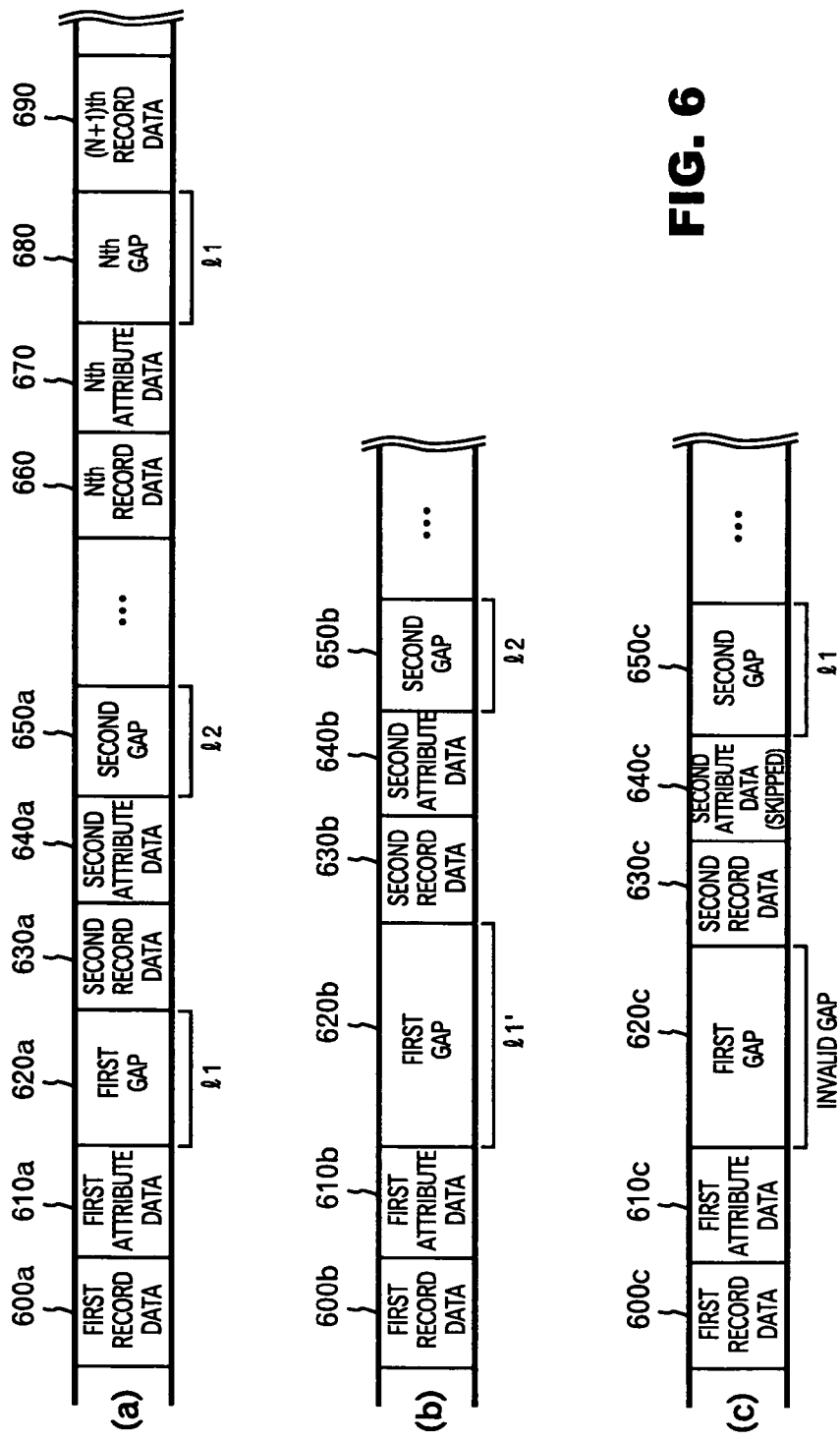
FIG. 6 shows data recording formats for recording medium 200 according to the embodiment of the present invention, in which (a) shows a case where additional data has been recorded multiple times, (b) shows a case where the recording position of second record data 630b has been changed, and (c) shows a case where recording position change information is used.

According to the modified embodiment described above, the storage device 110a can determine whether or not the additional data corresponding to the data recorded on the recording medium 200 is valid electronic watermarking data when the recording medium 200 is mounted thereon. The storage device 110a can then inhibit data from being read from the recording medium 200 when the additional data is not correct electronic watermarking data. FIG. 6 shows a data recording format in the case where the recording medium 200 is a magnetic tape in accordance with the LTO standard. The reference numerals 600a to 600c, 630a to 630c, and 690 denote block recording areas for recording the respective blocks obtained by dividing the data to be written. First attribute data 610a to 610c, second attribute data 640a to 640c, and Nth attribute data 670 are block attributes written in association with the first record data 600a to 600c, the second record data 630a to 630c, and the Nth record data 660, respectively. First gaps 620a to 620c, second gaps 650a to 650c, and an Nth gap 680 are block gaps each of which is to be provided between continuous blocks in the writing process.

FIG. 6(a) shows a recording format in the case where the same additional data is recorded multiple times. In the writing process, by determining sizes of the block gaps such as the first gap 620a, the second gap 650a and the Nth gap 680, based on additional data stored in the additional data storing section 230, the recording position acquiring section 255 determines the recording positions of the second record data 630a, the Nth record data 660 and the Nth gap 680. For example, if the first data value of the additional data is "d1", then the length of the first gap 620a is set to 11, and if the first data value of the additional data is "d2", then the length of the gap 620a is set to 12, and so forth. Thus, the length of a block gap is determined based on each data value of the additional data. When the data value is a particular value such as 0, the corresponding length of a block gap may be set to 0. Thus, the recording medium 200 includes multiple block recording areas for recording the respective blocks obtained by dividing the data to be recorded, such as the first record data 600a, the second record data 630a, the Nth record data 660 and the (N+1)th record data 690, and the recording positions on the recording medium 200 for the block recording areas are determined based on the additional data recorded on the recording medium 200 in association with the data to be recorded. More particularly, the recording positions are determined by determining the sizes of the respective block gaps provided between continuous block storage areas based on the additional data.

In FIG. 6(a), the recording position determining section 235 groups the blocks obtained by dividing the data to be written into multiple groups and determines recording positions on the recording medium where the respective blocks included in each of the groups should be written, based on the additional data. That is, in FIG. 6(a), the blocks obtained by dividing the data to be written are grouped into a group including record data from the first record data 600a to the (N−1)th record data and a group including the Nth record data 660 and subsequent record data, and the additional data is recorded in each block gap in each group. Accordingly, in the storage device 110a, the additional data can be repeatedly written multiple times in association with the data to be written, so that correct additional data can be read out even when any fault is caused in one of the additional data.

FIG. 6(b) shows a recording format in the case where the recording position of the second record data 630b has been changed. In the recording format of FIG. 6(b), when the respective blocks are written, the recording position determining section 235 determines multiple recording positions on the recording medium 200 where the blocks should be written, respectively, based on the additional data. The block writing section 240 then writes a block on one recording position selected from the multiple recording positions where the block should be written. That is, in the recording format of FIG. 6(b), when the second record data 630b is written, the recording position determining section 235 determines multiple lengths such as 11, 11 ' and 11 " for the first gap 620b which is an example of a recording position on the recording medium 200 where the second record data 630b should be written. The block writing section 240 then selects one writable recording position, for example, among those recording positions and writes the block there. Accordingly, the storage device 110a can select a different recording position for writing in case of any fault caused in writing to the recording position determined by the recording position determining section 235.

FIG. 6(c) shows a recording format in the case where recording position change information is used, which indicates that a recording position determined based on the additional data has been changed. In FIG. 6(c), when it is impossible to write one block to a recording position on the recording medium 200 where that block should be written, the block writing section 240 writes that block and recording position change information indicating that the recording position of that block has been changed to another recording position different from the recording position where that block should be written. That is, in FIG. 6(c), the block writing section 240 cannot set the length 11 for the first gap 620c where the second record data 630c should be written, because of a fault caused in the writing process, for example. In this case, the block writing section 240 writes the second record data 630c with a value different from the value determined based on the additional data set for the length of the first gap 620c, and writes recording position change information "skipped", which indicates that the recording position of the second record data 630c has been changed, on the second attribute data 640c. Thus, in the reading process, as a result of reading the recording position change information "skipped" recorded in the second attribute data 640c, the recording position acquiring section 255 can recognize that the record position of the first gap 620c is invalid and extract additional data from the second gap 650c and subsequent gaps.

Figure 7:
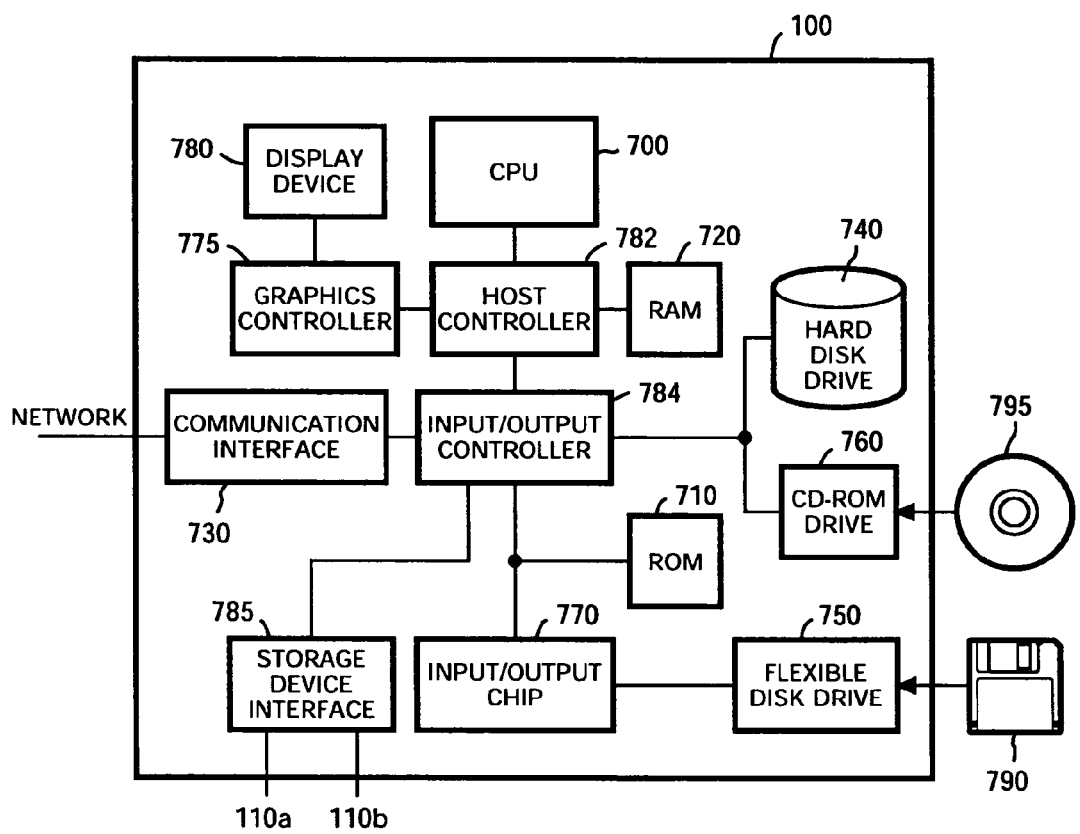
FIG. 7 shows a configuration of information processing device 100 according to the embodiment of the present invention.

FIG. 7 shows an example of a hardware configuration of the information processing device 100 according to the embodiment. The information processing device 100 according to the embodiment comprises a CPU/peripheral part including a CPU 700, a RAM 720, a graphic controller 775 and a display device 780, which are mutually connected via a host controller 782; an input/output part including a communication interface 730, a hard disk drive 740, a CD-ROM drive 760 and a storage device interface 785, which are connected to the host controller 782 via an input/output controller 784; and a legacy input/output part including a ROM 710, a flexible disk drive 750 and an input/output chip 770, which are connected to the input/output controller 784.

The host controller 782 connects the RAM 720 with the CPU 700 and the graphic controller 775 which access the RAM 720 at a high transmission rate. The CPU 700 operates based on programs stored in the ROM 710 and the RAM 720 to control each part. The graphic controller 775 acquires image data that is generated in a frame buffer provided within the RAM 720 by the CPU 700 to display it on the display device 780. Alternatively, the graphic controller 775 may include therein a frame buffer for storing image data generated by the CPU 700. The input/output controller 784 connects the host controller 782 with the communication interface 730, the hard disk drive 740, the CD-ROM drive 760 and the storage device interface 785, which are relatively high speed input/output devices. The communication interface 730 communicates with other devices via a network. The hard disk drive 740 stores programs and data to be used by the information processing device 100. The CD-ROM drive 760 reads a program or data from a CD-ROM 795 and provides it for the storage device interface 785 via the RAM 720 and the input/output controller 784. The input/output controller 784 accesses the storage devices 110a and 110b based on a request received by the communication interface 730 from other information processing devices connected via the network.

The ROM 710 and relatively low speed input/output devices, such as the flexible disk drive 750 and the input/output chip 770, are connected to the input/output controller 784. The ROM 710 stores a boot program to be executed by the CPU 700 at a startup time of the information processing device 100, and hardware dependent programs for the information improvements have been made should also be included in the technical scope of the present invention.

For example, if the recording medium 200 is a magnetic disk, an optical disk, or a magneto-optical disk, the recording position determining section 235 may determine recording positions such as tracks or sectors where the respective blocks are to be written, based on the additional data.

As is apparent from the above description, according to the present invention, it is possible to store digital data in a storage device with data, which is to be recorded in association with the digital data, added to the digital data without changing the original digital data to be written.

The invention claimed is:

1. A system for controlling storage of primary data to a storage device, comprising:
   a processor coupleable to the storage device, wherein the processor is configured for:
      writing continuous blocks of said primary data to a recording medium of said storage device, said primary data comprising non-changing digital data, including one or more block gaps between said written continuous blocks of said primary data on said recording medium, and
      writing an additional data block comprising additional data in each block gap on said recording medium such that two continuous primary data blocks are separated by the additional data blocks, wherein:
         said additional data is stored separately from said primary data,
         said additional data is electronic watermarking data for identifying said recording positions of said primary data and for inhibiting illegally copied primary data from being read from the storage device or another device to which the primary data is copied, and
         said electronic watermarking data comprises each of a serial number of a device that is writing said additional data block, an identifier of a user that requested the writing of said primary data, and a password for releasing a read restriction of said primary data.

2. The system of claim 1, where said electronic watermarking data further comprises:
   a data and time of a writing of said primary data into said storage device;

an identification information for said primary data; and
a password for releasing a read restriction on said primary data.

3. The system of claim 1, wherein said electronic watermarking data further comprises a data value indicating how many times said primary data has been copied in the past.

4. The system of claim 1, wherein the processor is further configured for:
storing said electronic watermarking data in an additional data storing memory in said storage device;
comparing said electronic watermarking data stored in said additional data storing memory in said storage device with said electronic watermarking data recorded on said recording medium; and
inhibiting a reading of said primary data if said electronic watermarking data stored in said additional data storing medium in said storage device does not match said electronic watermarking data recorded on said recording medium.

5. The system of claim 1, wherein the electronic watermarking data further comprises fault information for identifying a fault caused in writing onto the recording medium, wherein the fault is concealed from the user.

6. The system of claim 1, wherein:
a block writing section writes respective blocks to the recording positions on the recording medium that have been determined by a recording position determining section; and
a read control section processes a read request from an information processing device coupled to the storage device by reading the primary data, which has been divided into multiple blocks, from the recording positions on the recording medium where the respective blocks are recorded; and
the processor further configured for:
composing said primary data to be read by putting together each of the respective blocks read;
extracting the additional data recorded on the recording medium in association with the primary data being read; and
forwarding the additional data to the information processing device; and inhibiting the blocks from being read if the additional data extracted does not correspond to the electronic watermarking data that is recorded on the recording medium in association with said primary data.

7. The system of claim 1, wherein the processor is further configured for:
determining when a recording position of one block acquired does not correspond to a recording position associated with the electronic watermarking data recorded on the recording medium in association with the primary data written; and
in response to the determining that the recording position for one block does not correspond to the recording position associated with the electronic watermarking data, determining that extracted additional data is invalid.

8. The system of claim 1, wherein if extracted additional data does not match a corresponding portion of the electronic watermarking data stored, wherein the processor is further configured for:
determining that the extracted additional data is invalid; and
inhibiting a reading of the block that has been determined to be stored in a recording position that does not correspond to the electronic watermarking data, and subsequent blocks of said primary data.

9. The system of claim 1, wherein the processor is further configured for:
detecting a mount of the recording medium;
determining whether the additional data corresponding to the primary data recorded on the recording medium is valid electronic watermarking data when the recording medium is mounted; and
inhibiting the primary data from being read from the recording medium when the additional data does not correspond to the valid electronic watermarking data.

10. The system of claim 1, wherein the electronic watermark data is information on the recording positions of the respective blocks of the primary data, wherein the processor is further configured for:
preventing a transfer of the information on recording positions of the respective blocks when the recording medium is copied, wherein the information on the recording positions is lost to the medium to which the primary data is copied; and
detecting when said primary data is illegally copied by detecting that the primary data is recorded on an alternate medium without said electronic watermarking data associated with said primary data.

11. A physical computer storage memory comprising a computer program product for controlling storage of primary data to a storage device, the computer program product comprising:
computer code for writing continuous blocks of said primary data to a recording medium of said storage device, said primary data comprising non-changing digital data;
computer code for including one or more block gaps between said written continuous blocks of said primary data on said recording medium; and
computer code for writing an additional data block comprising additional data in each block gap on said recording medium such that two continuous primary data blocks are separated by the additional data blocks, wherein:
said additional data is stored separately from said primary data,
said additional data is electronic watermarking data for identifying said recording positions of said primary data and for inhibiting illegally copied primary data from being read from the storage device or another device to which the primary data is copied, and
said electronic watermarking data comprises each of a serial number of a device that is writing said additional data block, an identifier of a user that requested the writing of said primary data, and a password for releasing a read restriction of said primary data.

12. The physical computer storage memory of claim 11, where said electronic watermarking data further comprises:
a data and time of a writing of said primary data into said storage device;
an identification information for said primary data; and
a password for releasing a read restriction on said primary data.

13. The physical computer storage memory of claim 11, wherein said electronic watermarking data further comprises a data value indicating how many times said primary data has been copied in the past.

14. The physical computer storage memory of claim 11, further comprising:
computer code for storing said electronic watermarking data in an additional data storing memory in said storage device;

computer code for comparing said electronic watermarking data stored in said additional data storing memory in said storage device with said electronic watermarking data recorded on said recording medium; and computer code for inhibiting a reading of said primary data if said electronic watermarking data stored in said additional data storing medium in said storage device does not match said electronic watermarking data recorded on said recording medium.

15. The physical computer storage memory of claim 11, wherein the electronic watermarking data further comprises fault information for identifying a fault caused in writing onto the recording medium, wherein the fault is concealed from the user.

16. The physical computer storage memory of claim 11, wherein:

a block writing section writes respective blocks to the recording positions on the recording medium that have been determined by a recording position determining section; and a read control section processes a read request from an information processing device coupled to the storage device by reading the primary data, which has been divided into multiple blocks, from the recording positions on the recording medium where the respective blocks are recorded; and the computer program product further comprising:

computer code for composing said primary data to be read by putting together each of the respective blocks read;

computer code for extracting the additional data recorded on the recording medium in association with the primary data being read;

computer code for forwarding the additional data to the information processing device; and inhibiting the blocks from being read if the additional data extracted does not correspond to the electronic watermarking data that is recorded on the recording medium in association with said primary data.

17. The physical computer storage memory of claim 11, further comprising:

computer code for determining when a recording position of one block acquired does not correspond to a recording position associated with the electronic watermarking data recorded on the recording medium in association with the primary data written; and in response to the determining that the recording position for one block does not correspond to the recording position associated with the electronic watermarking data, computer code for determining that extracted additional data is invalid.

18. The physical computer storage memory of claim 11, wherein if extracted additional data does not match a corresponding portion of the electronic watermarking data stored, the computer program product further comprising:

computer code for determining that the extracted additional data is invalid; and computer code for inhibiting a reading of the block that has been determined to be stored in a recording position that does not correspond to the electronic watermarking data, and subsequent blocks of said primary data.

19. The physical computer storage memory of claim 11, further comprising:

computer code for detecting a mount of the recording medium;

computer code for determining whether the additional data corresponding to the primary data recorded on the recording medium is valid electronic watermarking data when the recording medium is mounted; and computer code for inhibiting the primary data from being read from the recording medium when the additional data does not correspond to the valid electronic watermarking data.

20. The system of claim 1, wherein the electronic watermark data is information on the recording positions of the respective blocks of the primary data, further comprising:

computer code for preventing a transfer of the information on recording positions of the respective blocks when the recording medium is copied, wherein the information on the recording positions is lost to the medium to which the primary data is copied; and computer code for detecting when said primary data is illegally copied by detecting that the primary data is recorded on an alternate medium without said electronic watermarking data associated with said primary data.

* * * * *